United States Patent
Lo

(10) Patent No.: US 6,170,513 B1
(45) Date of Patent: Jan. 9, 2001

(54) INFLATION NOZZLE STRUCTURE OF AN INFLATABLE ENVELOPE

(76) Inventor: Luke Lo, 1F, No. 9, Lane 34, Chin-Men St., Taipei (TW)

(*) Notice: Under 35 U.S.C. 154(b), the term of this patent shall be extended for 0 days.

(21) Appl. No.: 09/418,125

(22) Filed: Oct. 14, 1999

(51) Int. Cl.[7] .................................................. F16K 15/20
(52) U.S. Cl. ...................... 137/223; 137/846; 137/522; 446/224
(58) Field of Search .................................. 137/844, 846, 137/847, 223, 522; 446/224

(56) References Cited

U.S. PATENT DOCUMENTS

| | | | |
|---|---|---|---|
| 4,547,168 | * 10/1985 | Blacksberg et al. | 446/222 |
| 4,842,007 | * 6/1989 | Kurtz | 137/223 |
| 4,917,646 | * 4/1990 | Kieves | 446/224 |
| 5,188,558 | * 2/1993 | Barton et al. | 446/224 |
| 5,209,264 | * 5/1993 | Koyanagi | 137/846 X |
| 5,248,275 | * 9/1993 | McGrath et al. | 446/224 |
| 5,295,892 | * 3/1994 | Felton | 446/224 |
| 5,308,163 | * 5/1994 | Abe | 137/846 X |
| 5,336,123 | * 8/1994 | Laske et al. | 446/224 |
| 5,451,179 | * 9/1995 | LaRoi, Jr. et al. | 446/224 |
| 5,456,716 | * 10/1995 | Iversen et al. | 137/846 X |
| 5,482,492 | * 1/1996 | Becker | 446/224 X |
| 5,595,521 | * 1/1997 | Becker | 446/224 |
| 5,860,441 | * 1/1999 | Garcia | 137/846 X |
| 5,878,768 | * 3/1999 | Carrasco | 137/223 X |
| 5,934,310 | * 8/1999 | Littlehorn | 137/223 |
| 6,015,472 | * 1/2000 | Garcia | 137/223 |
| 6,015,601 | * 1/2000 | Garcia | 137/223 |
| 6,019,122 | * 2/2000 | Chen | 137/223 |
| 6,027,394 | * 2/2000 | Terazaga Carrasco | 446/224 |
| 6,042,448 | * 3/2000 | Littlehorn | 446/224 X |

* cited by examiner

Primary Examiner—John Rivell
Assistant Examiner—Meredith H. Schoenfeld
(74) Attorney, Agent, or Firm—Dougherty & Troxell

(57) ABSTRACT

An inflation nozzle structure of an infatable envelope. The inflatable envelope is formed by two envelope membranes the peripheries of which are adhered to each other. The inner membranes are adhered to an edge of the envelope membranes and inward extend from the edge. The two inner membranes are adhered to each other to define an air passage serving as the inflation nozzle. An isolating membrane is sandwiched between the inner membranes near an outer opening of the air passage. Two faces of the isolating membrane are formed by two kinds of membranes with different melting points. When thermally pressed, one face with lower melting point of the isolating membrane is thermally adhered to inner wall of the air passage, while the other face with higher melting point is not adhered. Therefore, when thermally pressing and forming the inflatable envelope and the inflation nozzle, the operation can be continued and speeded without complicated processing procedure. The isolating membrane also serves to mark the position of the air passage for easily finding the inflation nozzle in use.

4 Claims, 10 Drawing Sheets

INFLATION NOZZLE STRUCTURE OF AN INFLATABLE ENVELOPE

BACKGROUND OF THE INVENTION

The present invention relates to a simple inflation nozzle structure of an inflatable envelope. Prior to forming the air passage of the inflatable envelope, an isolating membrane is previously disposed at the position of the air passage so as to simplify the procedure of forming the air passage on the inflatable envelope.

FIGS. 1 to 4 show the inflation nozzle structure of a conventional inflatable envelope. In manufacturing, the inflation nozzle 2 is first completed and then an isolating member is placed into the air passage 21 of the inflation nozzle 2. Prior to adhering and forming the inflatable envelope 1, the inflation nozzle 2 is first position between the two envelope membranes 5 of the inflatable envelope 1, whereby when adhering and forming the inflatable envelope 1, the inflation nozzle 2 is simultaneously adhered to the inflatable envelope 1 without sealing the air passage 21. After the inflatable envelope 1 is adhered and formed, the isolating member is removed.

In manufacturing the inflation nozzle 2 of the inflatable envelope 1, some shortcomings exist as follows:

1. Prior to adhering the inflation nozzle 2 with the inflatable envelope 1, it is necessary to first place the isolating member (which can be alternatively oil ink or paint) into the air passage 21. Therefore, when adhering and forming the inflatable envelope 1, the air passage 21 will not be adhered and sealed. The air passage 21 generally is not so large and often carries static charge so that the nozzle membranes 22 are often tightly attached to each other. This makes it difficult to place the isolating member into the air passage 21.

2. It is necessary to previously complete the inflation nozzle 2 prior to adhering the inflation nozzle 2 with the inflatable envelope 1. Then the isolating member is placed into the air passage. Thereafter, the inflation nozzle 2 is adhered with the inflatable envelope 1 and formed together. Finally, the isolating member is removed. Such manufacturing procedure is discontinuous and it takes longer time to form the product. As a result, the production efficiency is reduced.

3. In manufacturing and use of the conventional inflation nozzle, it is necessary to provide a simple identification of the position of the inflation nozzle. Therefore, the inflation nozzle is such formed as to extend out of the inflatable envelope 1 by a certain length for easy identification of the position of the inflation nozzle. For keeping the extension of the inflation nozzle, an excessive part is formed in both manufacturing and use. This leads to trouble to a certain extent.

4. In manufacturing of the inflation nozzle, it is necessary to previously place the isolating member into the air passage 21 without attaching to the inner wall thereof. Thereafter, the isolating member must be removed. Under such circumstance, the isolating member tends to detach from the air passage in manufacturing. This will result in defective product.

FIGS. 5 to 8 show another type of inflation nozzle structure of the inflatable envelope. In manufacturing, the two inner membranes 51 are first thermally pressed to form an air passage 21. Then two envelope membranes 5 are overlaid on upper and lower sides thereof. Then an isolating layer 6 is placed between the two inner membranes 51 of the reserved mouth section of the inflation nozzle. Then the nozzle mouth 52 is thermally pressed to respectively adhere the inner membranes 51 to the envelope membranes 5. However, the two inner membranes 51 are not adhered to each other. Thereafter, the isolating layer 6 is removed and an L-shaped thermally pressing mold is used to thermally press and adhere the respective membranes 5, 51, the side 53 of the nozzle and the edge 3 of the envelope.

The above manufacturing procedure is quite complicated. In the final step, the L-shaped mold with fixed specification is used to thermally press and adhere the nozzle side and envelope edge. Therefore, when manufacturing another specification of inflatable envelope with different length and size, it is necessary to manufacture another specification of mold or adjust the mold in accordance with the size of the envelope. As a result, when producing a new specification of inflatable envelope by test or mass-produce the inflatable envelope, it is necessary to make a new mold and rectify the position of the mold. Moreover, after finished, it is necessary to tear off the remaining material adjacent to the edge of the nozzle. Such operation is troublesome and complicated and time-consuming and will lead to waste material. Furthermore, in case that the tested product has poor quality, the mold with new specification will be wasted.

SUMMARY OF THE INVENTION

It is therefore a primary object of the present invention to provide an inflation nozzle structure of an inflatable envelope. The adhesion and forming of the inflation nozzle can be quickly completed so as to continue the manufacturing procedure of the inflatable envelope. An isolating membrane is sandwiched between the inner membranes defining the air passage of the inflation nozzle. One face of the isolating membrane is laid with a glue layer or two faces of the isolating membrane are formed by two kinds of membranes with different melting points. When thermally pressing the envelope membranes and the inner membranes, one face of the isolating membrane is thermally adhered to inner wall of one of the inner membranes without detachment, while the other face with higher melting point will not be adhered to the inner membrane so as to form the air passage. Therefore, the inflation nozzle can be formed together with the overlaying envelope membranes so as to simplify the manufacturing procedure. Moreover, under the condition that the inflation nozzle does not extend outward, the opening of the nozzle is positioned on the same straight lines as the adhesion edge. Therefore, the manufacturing of the mold is facilitated. In addition, the thermally pressing and adhesion is performed in straight line pattern so that one single mold can be used to manufacture different specifications of inflatable envelopes. As a result, the procedures of adhesion of the isolating membrane and the forming and overlaying of the membranes can be speeded and continuously performed by a machine so as to lower cost and enhance competition.

Also, after manufactured, the isolating membrane is attached to the opening of the nozzle, serving as a mark for the position of the nozzle so that it is easy to find the inflation nozzle and extend an inflating device into the inflation nozzle.

The present invention can be best understood through the following description and accompanying drawings wherein:

DETAILED DESCRIPTION OF THE PREFERRED EMBODIMENTS

Figure 1:
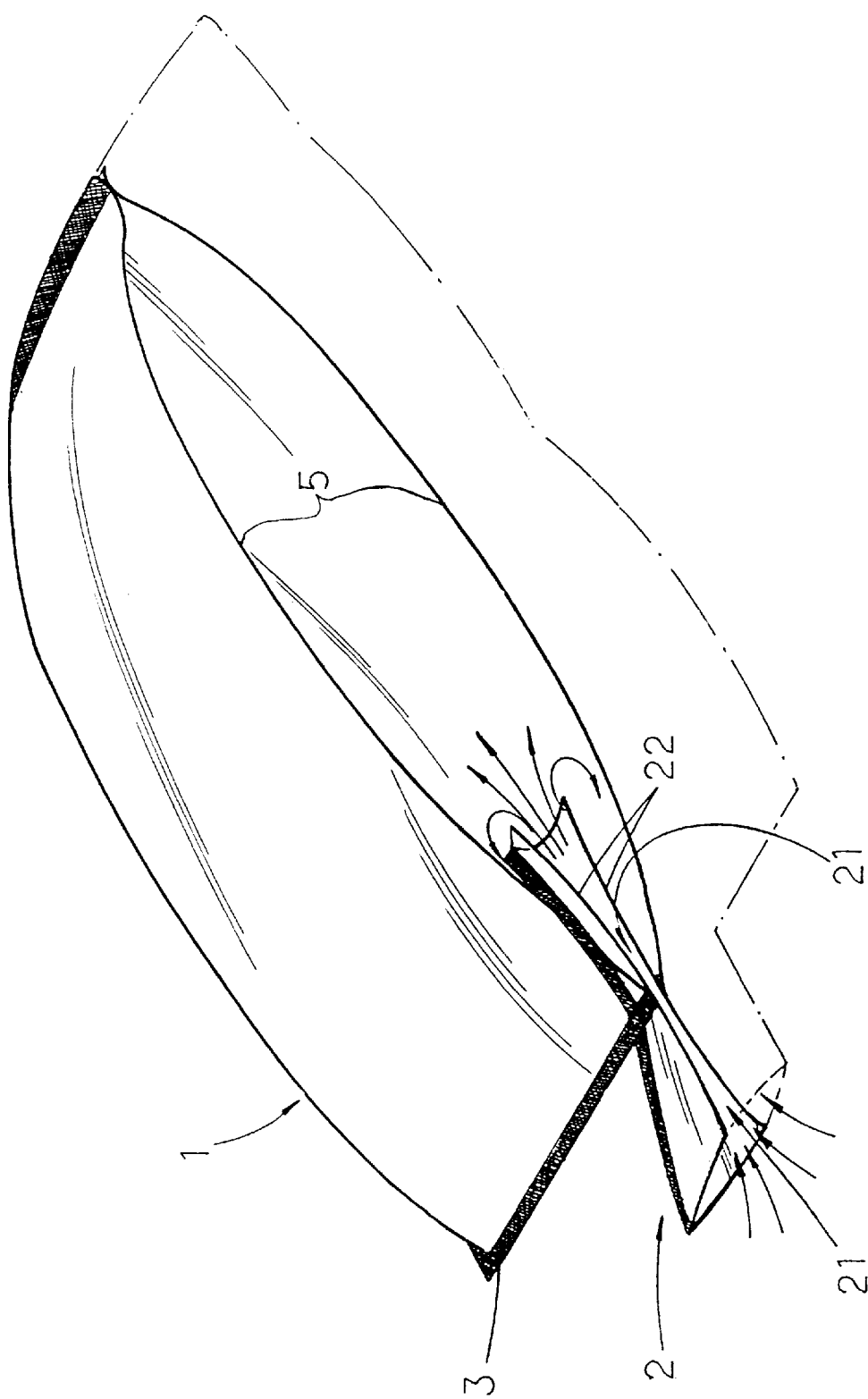
FIG. 1 is a perspective sectional view of the simple inflation nozzle of a conventional inflatable envelope.
Figure 2:
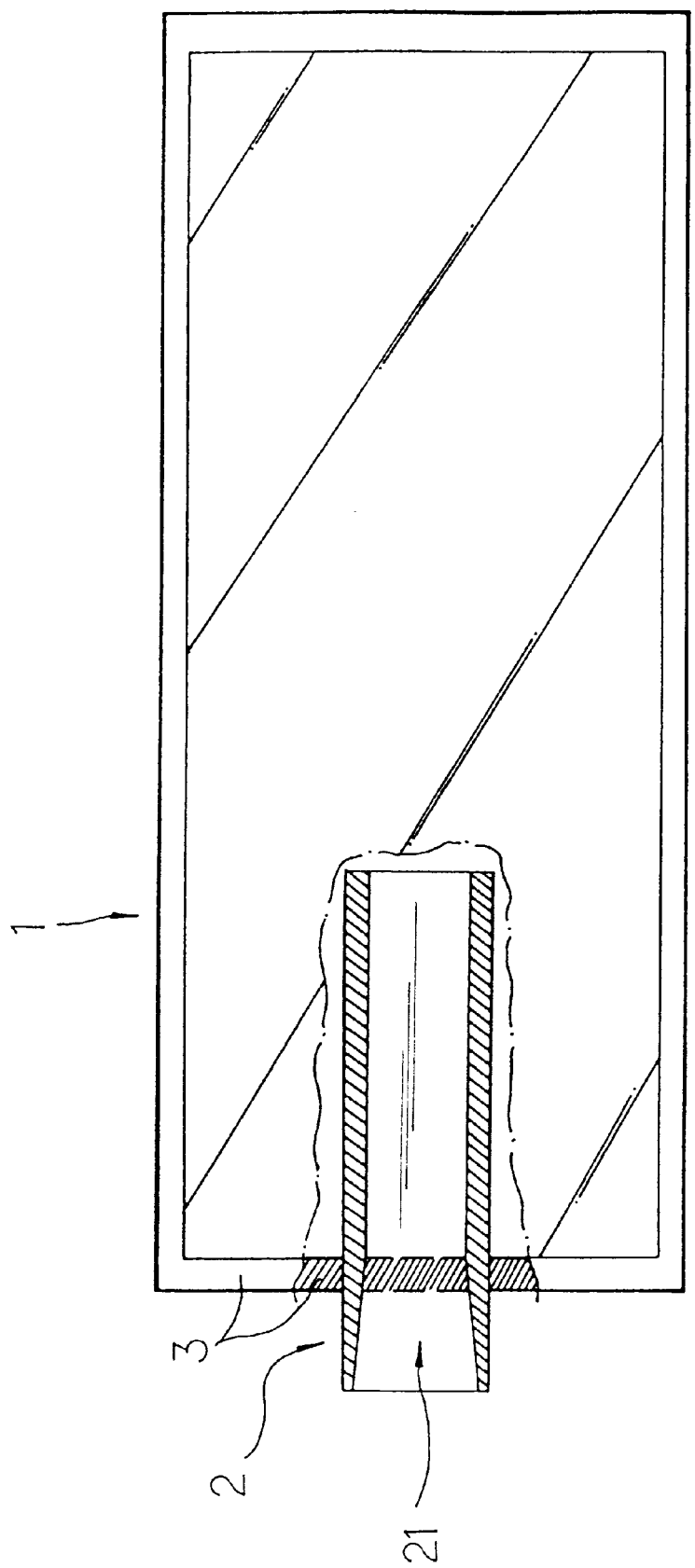
FIG. 2 is a plane sectional view of the simple inflation nozzle of the conventional inflatable envelope.
Figure 3:
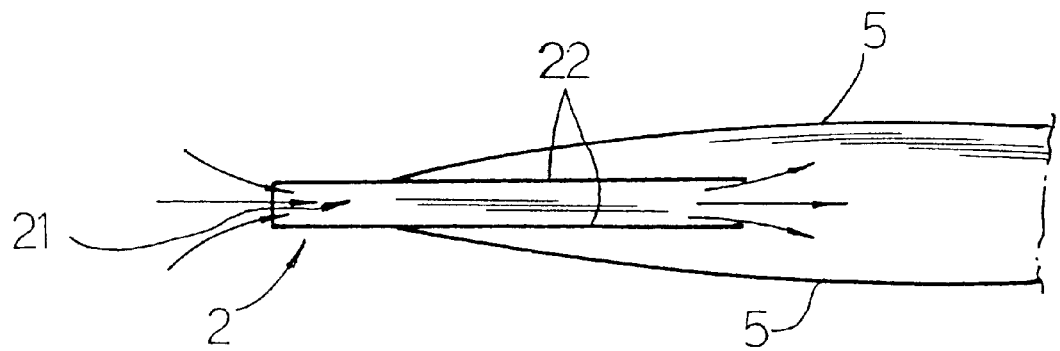
FIG. 3 is a sectional view showing the simple inflation nozzle of the conventional inflatable envelope in an inflated state.
Figure 4:
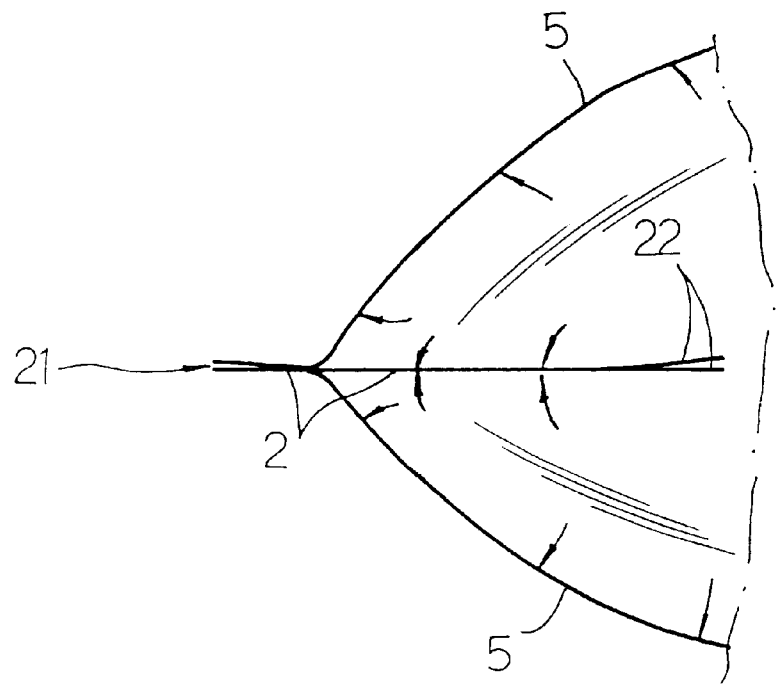
FIG. 4 is a sectional view showing the simple inflation nozzle of the conventional inflatable envelope after inflated.
Figure 5:
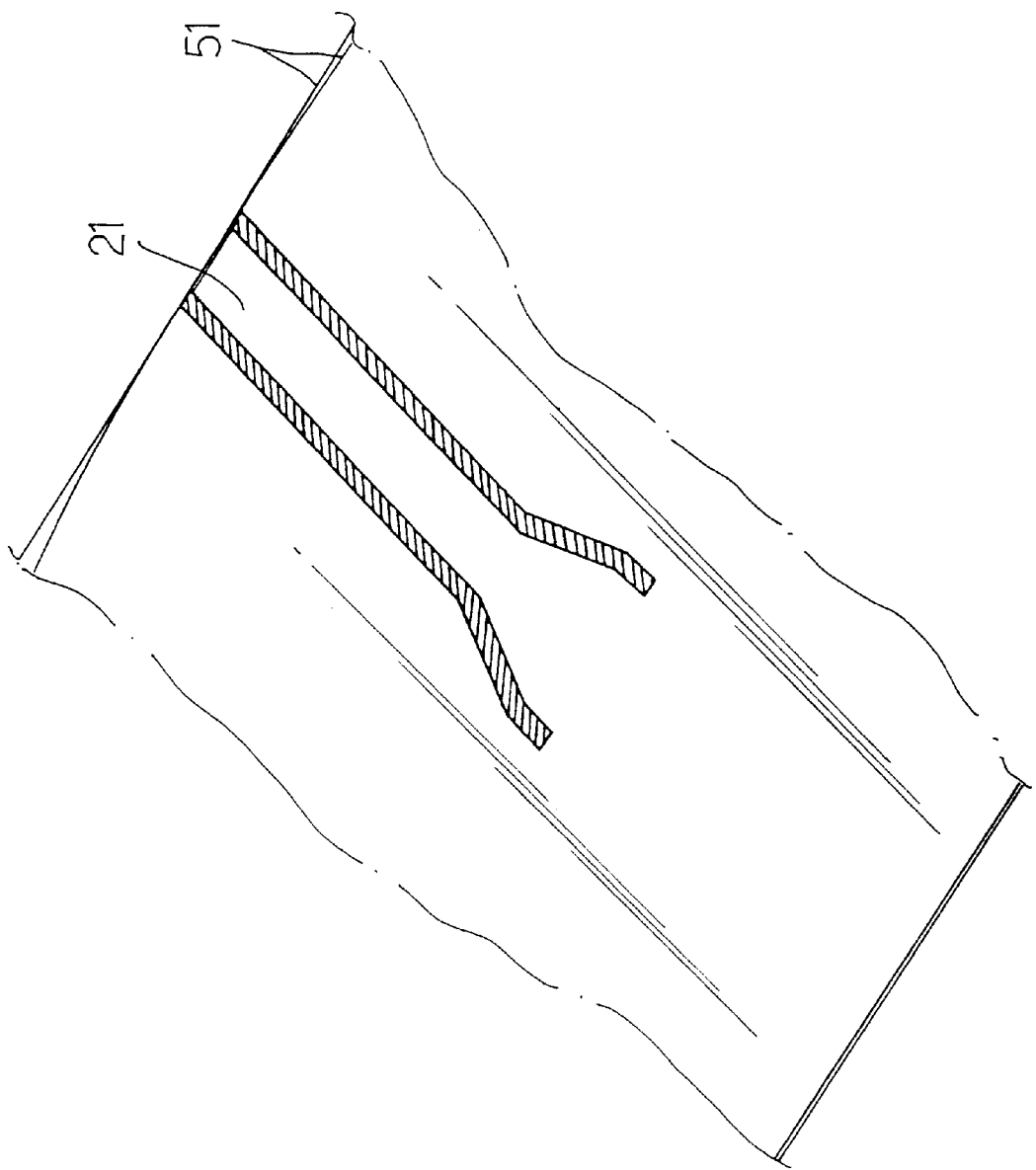
FIG. 5 is a sectional view of another type of simple inflation nozzle of the conventional inflatable envelope.
Figure 6:
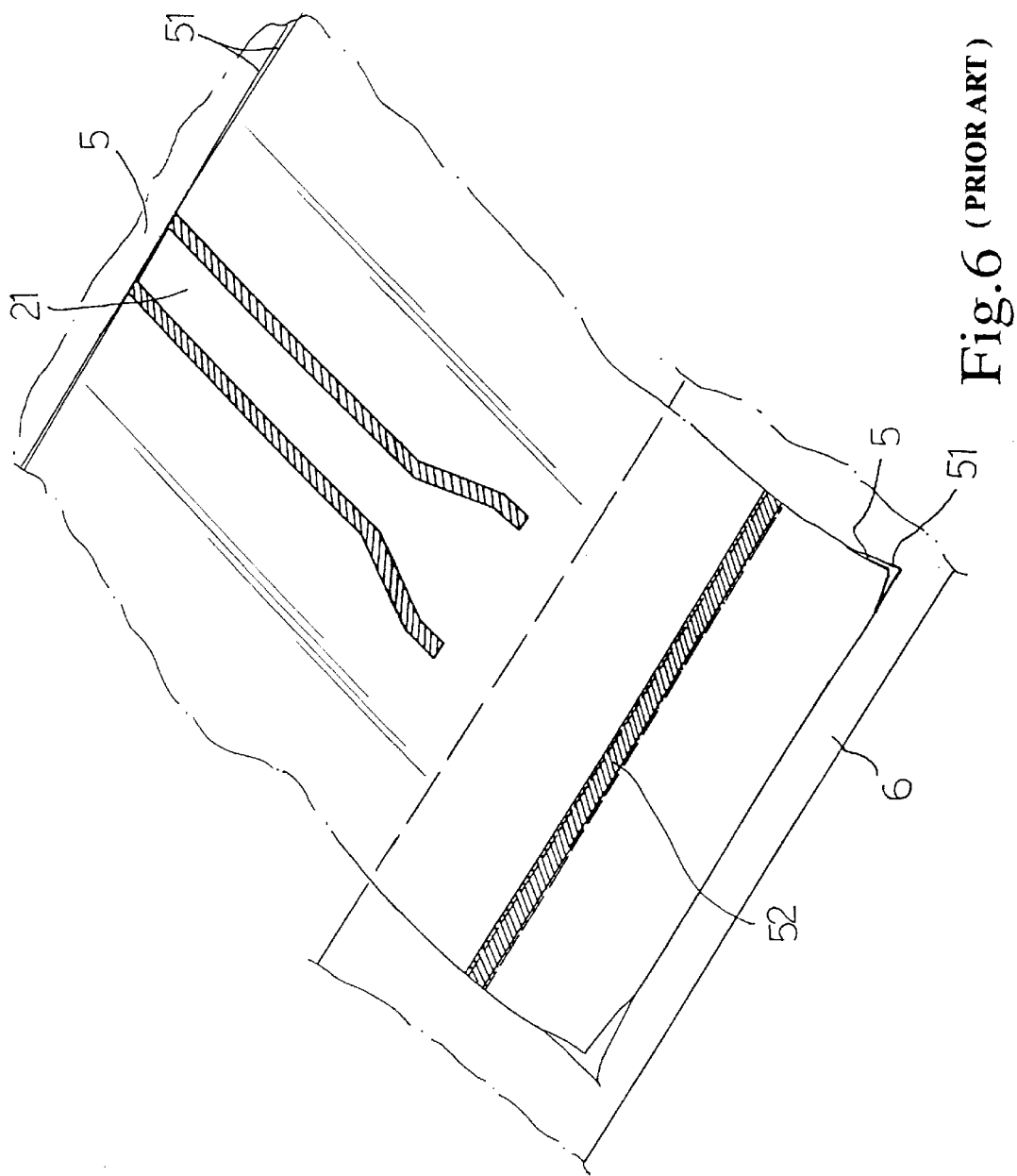
FIG. 6 is a sectional view of the simple inflation nozzle of the conventional inflatable envelope according to FIG. 5.
Figure 7:
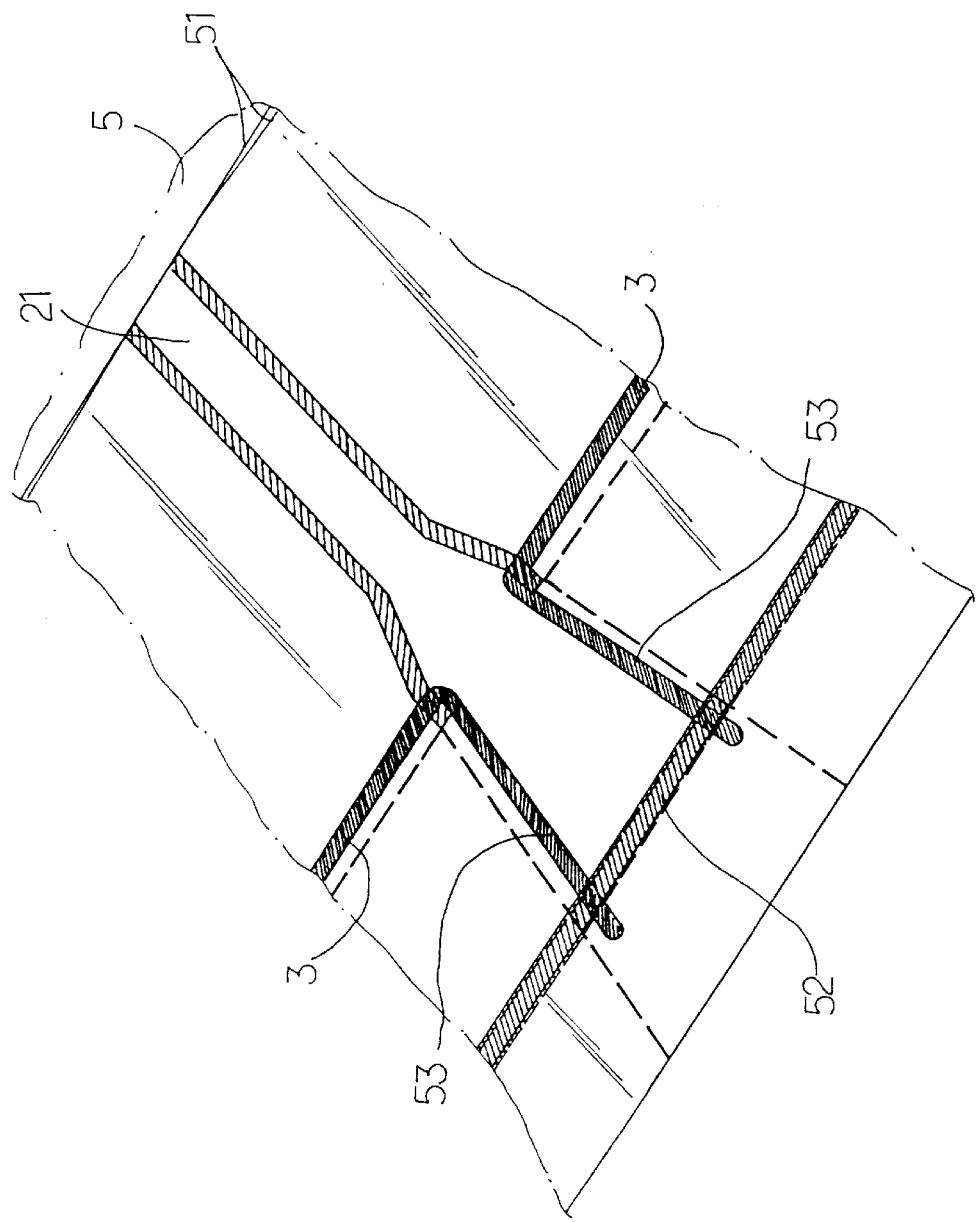
FIG. 7 is a sectional view showing the simple inflation nozzle of the conventional inflatable envelope in an inflated state according to FIG. 5.
Figure 8:
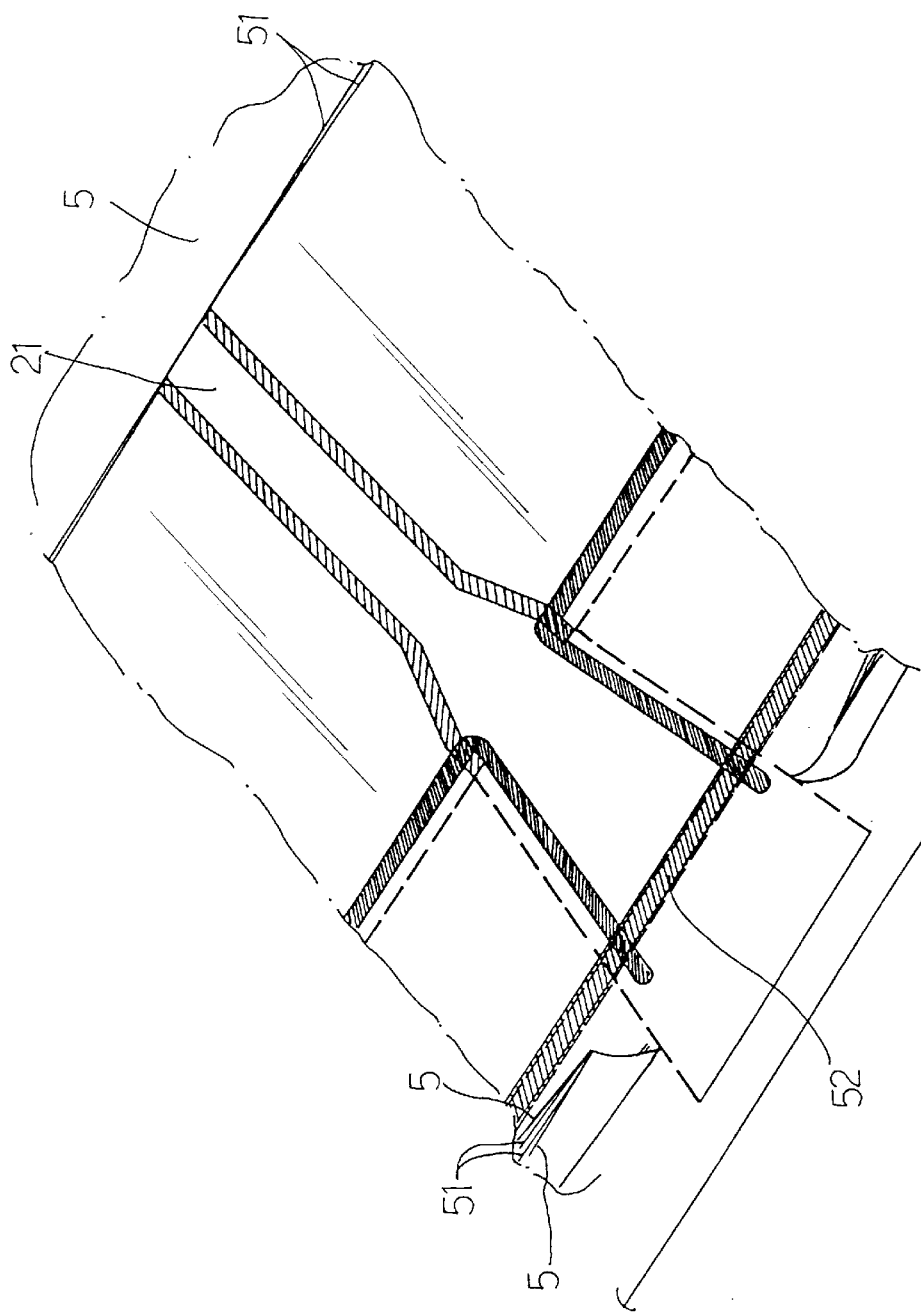
FIG. 8 is a sectional view showing the simple inflation nozzle of the conventional inflatable envelope after inflated according to FIG. 5.
Figure 9:
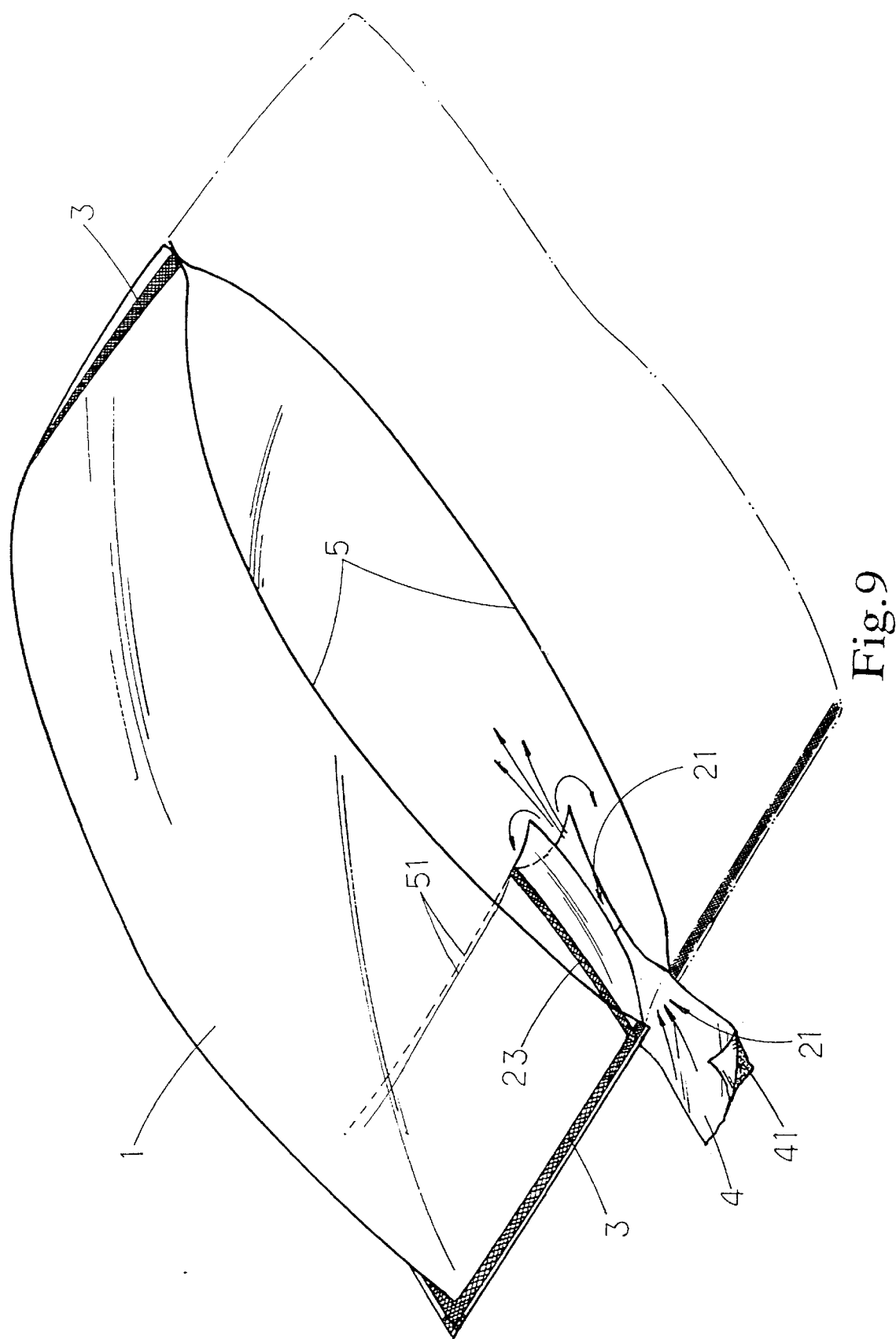
FIG. 9 is a perspective sectional view of the simple inflation nozzle of the inflatable envelope of the present invention.
Figure 10:
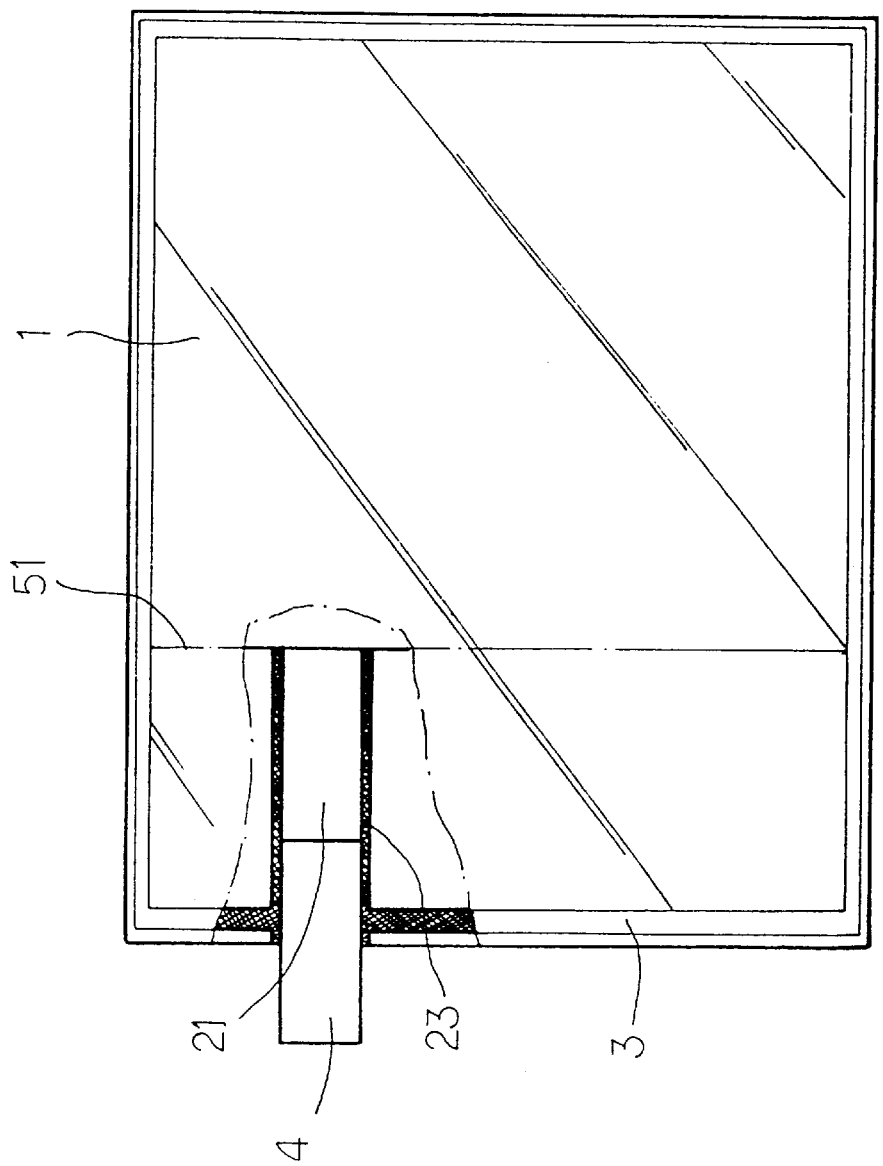
FIG. 10 is a plane sectional view of the simple inflation nozzle of the inflatable envelope of the present invention.
Figure 12:
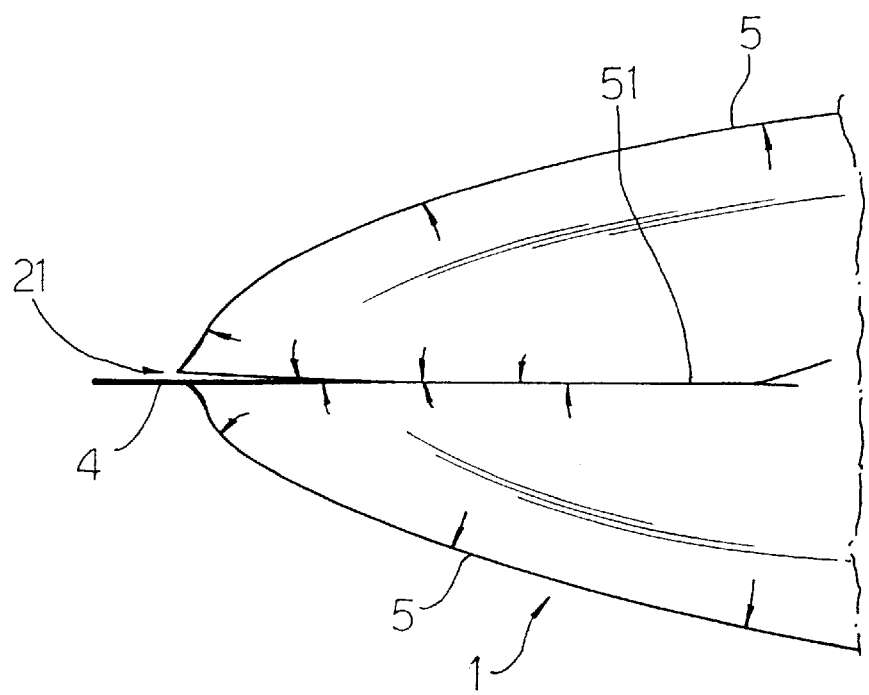
FIG. 12 is a sectional view showing the simple inflation nozzle of the inflatable envelope of the present invention after inflated.
Figure 11:
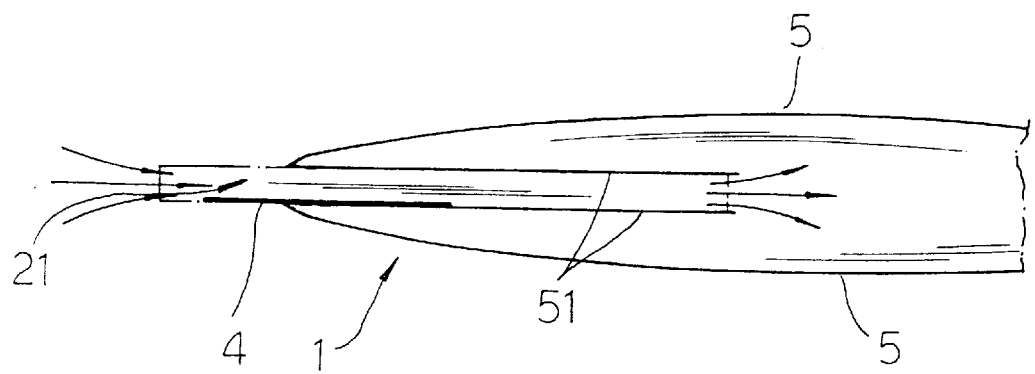
FIG. 11 is a sectional view showing the simple inflation nozzle of the inflatable envelope of the present invention in an inflated state.

Please refer to FIGS. 9 to 12. The inflatable envelope of the present invention is formed by two envelope membranes 5 the peripheries of which are adhered to each other. Two inner membranes 51 inward extend from the edge 3 of the envelope between the two envelope membranes 5. The two inner membranes 51 are attached to each other to form the nozzle membranes 22. At least a part of the nozzle membranes 22 inward extending from the edge 3 is adhered along an adhesion line 23 which defines an air passage 21 communicating external side with internal side. The nozzle membranes 22 also form an isolating membrane 4 one face of which is laid with a glue layer 41. When thermally pressed, the isolating membrane 4 is adhered to the inner wall of the inner membrane 51 defining the air passage 21. The isolating membrane 4 can be formed of a metal film one face of which is laid with a glue layer. Alternatively, the isolating membrane 4 can be formed of a kind of plastic membrane coated with another kind of plastic membrane. For example, one face of polyester membrane (PET) can be coated with a polyethylene membrane (PE). The envelope is formed in such a manner that the peripheries of the envelope membranes 5 are thermally pressed to adhere the edges 3 of the envelope and seal the outer peripheries of the inflatable envelope 1. When thermally pressed, at least one edge of the envelope membranes 5 between the between the envelope membranes 5 is disposed with at least two inward extending membranes 51. The isolating membrane 4 is sandwiched between the inner membranes 51 at a predetermined position and adhered thereto to define the air passage 21. The face of the isolating membrane 4 with the glue layer 41 on inner side of the air passage 21 is adhered to an inner side wall of the air passage 21. The other face free from the glue layer 41 will not be adhered to the other inner side wall of the air passage 21 to maintain the air passage pattern communicating external side with internal side. The isolating membrane 4 can be formed by two kinds of membranes with different melting points or formed of a metal film one single face of which is laid with glue layer. When thermally pressed, one face (with lower melting point) of the isolating membrane 4 is thermally pressed and adhered to the inner membrane, while the other face (with higher melting point) will not be adhered to the other inner side wall of the air passage 21 to maintain the air passage pattern communicating external side with internal side.

According to the above arrangement, in manufacturing, a straight mold can be used and the position of the opening can be directly adjusted. Therefore, the shortcomings existing in the conventional L-shaped mold and the troublesome rectification of the position of the air passage can be eliminated. In addition, in use, the position of the air passage 21 can be marked by the outward extending section of the isolating membrane 4 to facilitate use.

The above embodiment is only used to illustrate the present invention, not intended to limit the scope thereof. Many modifications of the above embodiment can be made without departing from the spirit of the present invention.

What is claimed is:

1. An inflation nozzle structure of an inflatable envelope, the inflatable envelope being formed by two envelope membranes the peripheries of which are adhered to each other, at least two inner membranes being adhered to an edge of the envelope membranes and inward extending from the edge, the two inner membranes being attached to each other to define an air passage communicating external side with internal side between the inner membranes, said inflation nozzle structure being characterized in that at least one isolating membrane is sandwiched between the inner membranes near an outer opening of the air passage, two faces of the isolating membrane being formed by two kinds of membranes with different melting points, whereby when thermally pressed and sealed, one face with lower melting point of the isolating membrane is thermally adhered in inner wall of one of the inner membranes, while the other face with higher melting point is not adhered to the inner wall of the other inner membrane so as to define the air passage.

2. An inflation nozzle structure of an inflatable envelope as claimed in claim 1, wherein the isolating membrane has a section outward extending from the air passage and serving as a mark for the position of the air passage.

3. An inflation nozzle structure of an inflatable envelope as claimed in claim 1, wherein the isolating membrane is formed by a metal film one face of which is laid with a glue material.

4. An inflation nozzle structure of an inflatable envelope as claimed in claim 2, wherein the isolating membrane is formed by a metal film one face of which is laid with a glue material.

* * * * *